United States Patent [19]
Tsukada

[11] Patent Number: 5,273,366
[45] Date of Patent: Dec. 28, 1993

[54] ROLLER LINEAR MOVEMENT GUIDING DEVICE

[75] Inventor: Toru Tsukada, Gunma, Japan

[73] Assignee: NSK Ltd., Tokyo, Japan

[21] Appl. No.: 969,578

[22] Filed: Oct. 30, 1992

[30] Foreign Application Priority Data

Oct. 30, 1991 [JP] Japan .................... 3-89254[U]

[51] Int. Cl.⁵ .................. F16C 29/06; F16C 23/00
[52] U.S. Cl. ............................ 384/45; 384/38; 384/57
[58] Field of Search ................... 384/43–45, 384/15, 37, 38, 42, 49, 50, 53, 57

[56] References Cited

U.S. PATENT DOCUMENTS

| | | | |
|---|---|---|---|
| 3,272,570 | 9/1966 | Zenk | 384/44 |
| 3,608,985 | 9/1971 | Swanson | 384/44 |
| 4,527,840 | 7/1985 | Mugglestone et al. | 384/45 |
| 4,637,738 | 1/1987 | Barkley | 384/38 |
| 4,744,763 | 5/1988 | Suzuki et al. | |
| 5,018,878 | 5/1991 | Tsukada et al. | 384/44 |
| 5,112,139 | 5/1992 | Tsukada | 384/44 X |

FOREIGN PATENT DOCUMENTS

| | | | |
|---|---|---|---|
| 2-203012 | 8/1990 | Japan | 384/45 |
| 461013 | 2/1975 | U.S.S.R. | 384/44 |

Primary Examiner—Thomas R. Hannon
Attorney, Agent, or Firm—Sughrue, Mion, Zinn Macpeak & Seas

[57] ABSTRACT

A roller type linear movement guiding device comprises: a plurality of roller type linear movement guiding bearings each having a number of rollers which circulate infinitely while rolling on a flat track surface; a holding board holding the bearings on the flat track surface; a table fixing board mounted over the holding board; and a steel ball inserted in recesses formed in the opposed surfaces of the holding board and the table fixing board at the load centers, so that the table fixing board is poised statically through the steel ball. With the device, even when the table fixing board is inclined, the holding board is held poised statically, whereby the roller type linear movement guiding bearings will never be twisted.

6 Claims, 5 Drawing Sheets

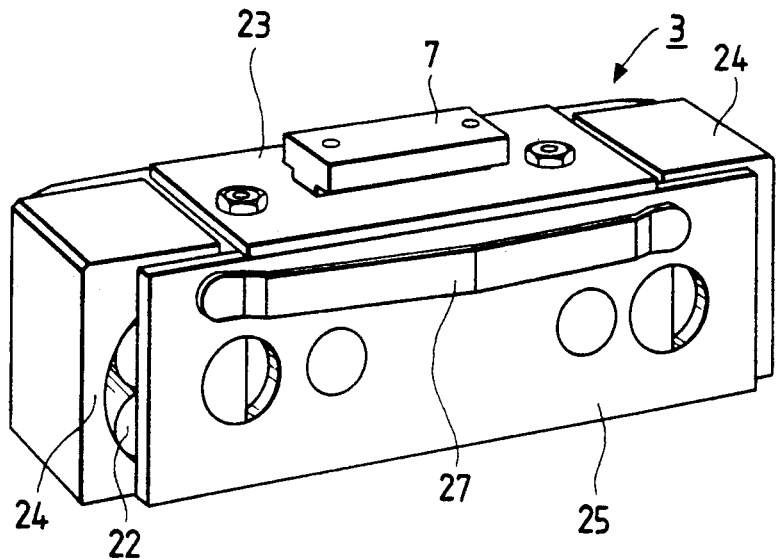
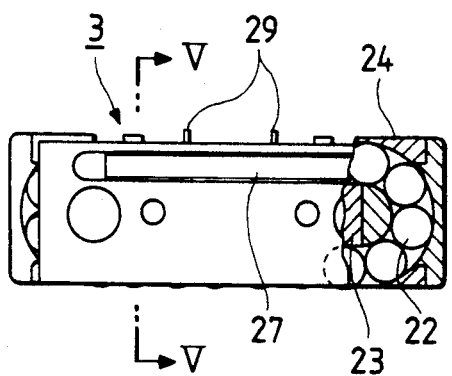
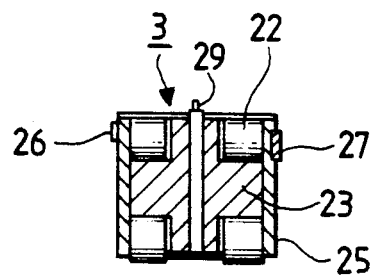

ROLLER LINEAR MOVEMENT GUIDING DEVICE

BACKGROUND OF THE INVENTION

This invention relates to an improvement of a roller type linear movement guiding device adapted to guide a moving object such as a table which moves straightly on the frame of a machine, in which a plurality of roller circulation type linear movement guiding bearings are arranged side by side to share the load equally.

A conventional roller type linear movement guiding device of this type is as shown in FIGS. 10 and 11. In the device, a plurality of roller type linear movement guiding bearings 3 (four bearings 3 in FIGS. 10 and 11) are arranged on the flat track surface 2 of a guide rail 1, and are surrounded by the right, left, front and rear side boards 4 of a holding board 5 so that they may not be moved away from one another. Each of the roller type linear movement guiding bearings 3 comprises a number of rollers 22 which circulate (revolve) infinitely while rolling. Therefore, the bearing 3 can be smoothly moved on the track surface of the guide rail 1 in the axial direction as the rollers 22 roll. On each of the bearings 3, there is provided a fitting plate 7. The latter 7 is T-shaped in section so as to reduce the load area and to concentrate the load at the center of the bearing. The holding board 5 is supported by the fitting plates 7, so that a load W applied to the holding board is shared equally by the fitting plates 7 and accordingly by the load rollers of the bearings 3.

As is apparent from the above description, in the conventional roller type linear movement guiding device, the weight of an object to be conveyed is supported by the whole upper surface 5a of the holding board 5 which is supported by the plurality of roller type linear movement guiding bearings 3. Hence, the inclination (indicated at $\theta$) in right-and-left direction of the object ("rolling") or the inclination (indicated at $\alpha$) in front-and-rear direction of the same ("pitching") which occurs for instance because of the assembling error of the device, is not automatically corrected. Hence, in this case, unbalanced loads are applied to the particular ones of the roller type linear movement guiding bearings 3 as indicated at $W_1$ and $W_2$. As a result, a trouble occurs with the device; for instance the bearings 3 may be twisted.

SUMMARY OF THE INVENTION

Accordingly, an object of this invention is to eliminate the above-described difficulties accompanying a conventional roller type direction driven guide device.

More specifically, an object of the invention is to provide a roller type linear movement guiding device which is able to automatically correct an inclination of a moving object, thus being free from load imbalance.

The foregoing object and other objects of the invention have been achieved by the provision of a roller type linear movement guiding device comprising: a plurality of roller type linear movement guiding bearings including a number of rollers which circulate infinitely while rolling on a flat track surface; and a holding board which holds the plurality of roller type linear movement guiding bearings on the flat track surface and distributes a load to the bearings, which, according to the invention, comprises: a table fixing board laid over the holding board; and an aligning curved surface body inserted in a recessed formed in at least one of the opposed surfaces of the table fixing board and holding board, the table fixing board being poised statically through the aligning curved surface body.

In the roller type linear movement guiding device, the aligning curved surface body interposed between the holding board and the table fixing board has an automatic aligning function. Hence, even if the table fixing board is inclined, the holding board is not inclined. And, even when a load applied to the table is eccentric, it is concentrated at the load center of the holding board.

The nature, principle, and utility of the invention will be more clearly understood from the following detailed description of the invention when read in conjunction with the accompanying drawings.

BRIEF DESCRIPTION OF THE DRAWINGS

FIG. 3 is a perspective view showing a roller type linear movement guiding bearing in the device;

FIG. 4 is a sectional view of the roller type linear movement guiding bearing shown in FIG. 3;

FIG. 5 is a sectional view taken along line V—V in FIG. 4;

DETAILED DESCRIPTION OF THE PREFERRED EMBODIMENTS

Preferred embodiments of this invention will be described with reference to the accompanying drawings.

Figure 1A:
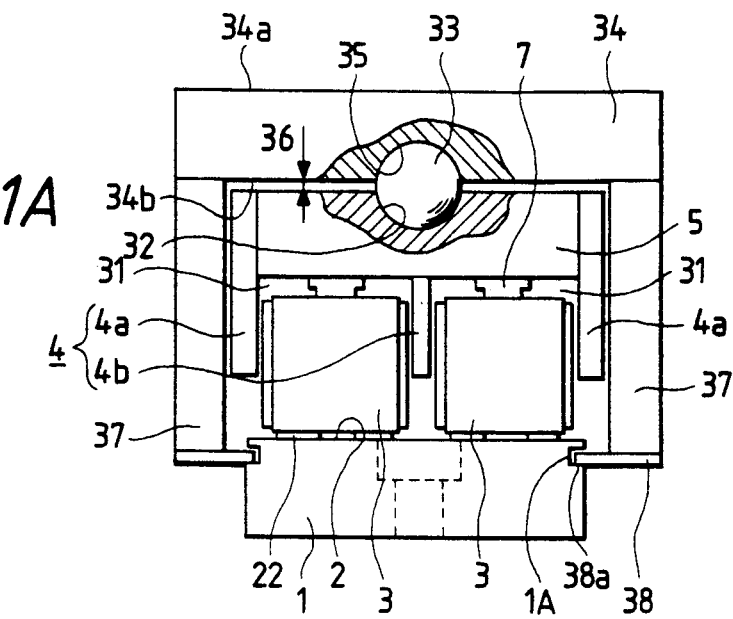
FIG. 1A is a front view, with parts cut away, showing a roller type linear movement guiding device, which constitutes a first embodiment of this invention.
Figure 2:
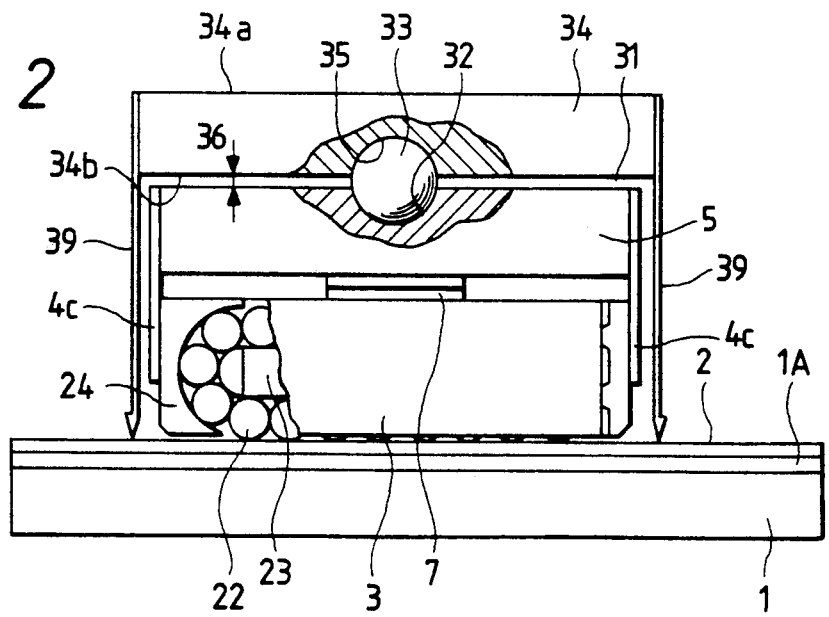
FIG. 2 is a side view, with parts cut away, showing the roller type linear movement guiding device.
Figure 10:
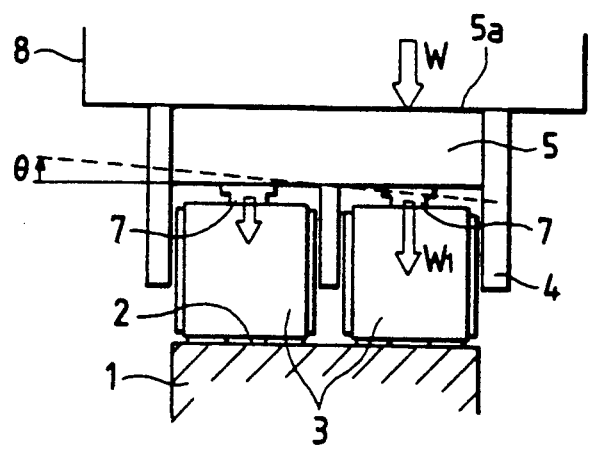
FIG. 10 is a front view of a conventional roller type linear movement guiding device.
Figure 11:
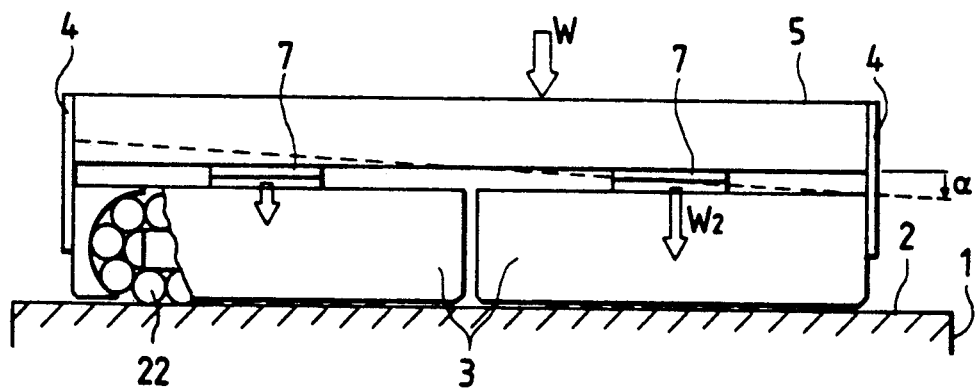
FIG. 11 is a side view of the conventional roller type linear movement guiding device shown in FIG. 10.

A roller type linear movement guiding device, a first embodiment of the invention, is as shown in FIGS. 1A and 2, in which parts corresponding functionally to those which have been described with reference to FIGS. 10 and 11 (the prior art) are therefore designated by the same reference numerals or characters.

The roller type linear movement guiding device comprises: two roller type linear movement guiding bearings 3 which are moved on the flat track surface of a guide rail 1 which is rectangular in section and is extended in the axial direction; a holding board 5 which holds the two roller type linear movement guiding bearings 3 and distributes a load to those bearings 3; and a table fixing board 34 which is poised statically over the holding board 5 through a steel ball 33 which has a function as an aligning curved surface body.

Each of the roller type linear movement guiding bearings 3, as shown in FIGS. 3 through 5 in more detail, comprises: rollers 22 in two lines which roll on the track surface 2 of the guide rail 1; a bearing body 23 cross in section which supports a load through the rollers 22; end caps 24 at both ends which are adapted to U-turn the rollers 22; and side boards 25 adapted to guide the rollers 22. In the bearing 3, the rollers 22 circulate infinitely while rolling, thus permitting a linear movement guiding operation without being limited in travel distance. That is, the arrangement of the roller type linear movement guiding bearing 3 is conventional. The roller type linear movement guiding bearing 3 is mounted in a bearing mounting recess 31 with the aid of a mounting reference surface 26 and a leaf spring 27 which are provided on the outer surfaces of the side walls 25, respectively, so that it is elastically held so as to prevent the bearing 3 from falling away. A spring pin 29 is provided on the upper surface of the bearing body 23 of the roller type linear movement guiding bearing. The spring pin 29 is engaged with a fitting plate 7 which is T-shaped in section so that it has an automatic aligning function. That is, the fitting plate 7 is mounted through the spring pin 29 on the upper surface of the roller type linear movement guiding roller 3.

The aforementioned holding board 5 is set on the fitting plates 7 of the roller type linear movement guiding bearings 3. The holding board 5 has side boards 4; namely, right and left boards 4a which are extended downwardly from the right and left edges, a central board 4b which is located between the right and left boards 4a and is also extended downwardly, and front and rear boards 4c which are extended downwardly from the front and rear edges. The holding board 5 and the side boards 4 form two bearing mounting recesses 31 and 31 below the holding board 5. The roller type linear movement guiding bearings 3 are fitted in the bearing mounting recesses 31 and 31 against the elastic forces of the leaf springs 7, respectively. Thus, the holding board 5 is set on the fitting plates 7.

A semi-spherical recess 32 is formed in the upper surface of the holding board 5 at the center. The lower half of the aforementioned steel ball 33 is put in the recess 32 thus formed.

The aforementioned table fixing board 34 has screw holes 50, with which bolts are engaged to fixedly mount a machine table on the upper surface 34a of the table fixing board. The table fixing board 34 has a semi-spherical recess 35 in the lower surface 34b at the center in such a manner that the recess 35 confronts with the above-described recess 32 of the holding board 5. The upper half of the steel ball 33 is fitted in the recess 35 of the table fixing board 34, whereby the table fixing board 34 is poised statically over the holding board 5 with a gap 36.

In this embodiment, the recess 32 of the holding board 5 and the recess 35 of the table fixing board are substantially equal to the steel ball 33 in a radius Right and left side boards 37 and 37 are extended downwardly from the right and left edges of the table fixing board 34 somewhat below the track surface 2 of the guide rail 1. The right and left side boards 37 and 37 have seal plates 38 of synthetic rubber at their lower end faces in such a manner that the seal plates 38 are held horizontal. The inner edges 38a of the seal plates 38 are in slide contact with guide grooves 1A and 1A formed in both sides of the guide rail 1, respectively. Seal plates 39 of synthetic rubber are fixedly secured to the front and rear end faces of the table fixing board 34, respectively, and extended downwardly, thus covering the front and rear openings which are defined by the table fixing board 34 and the right and left side boards 37 and 37. The lower edges of the seal plates 39 are in slide contact with the track surface 2 of the guide rail 1. Thus, the roller type linear movement guiding bearings 3 are substantially enclosed below the table fixing board 34, thus being prevented from the entrance of dust or the like.

Although the seal plates 38 and the seal plates 39 are made of synthetic rubber in the embodiment, the plates 38 and 39 may be made of plastics.

Figure 1B:
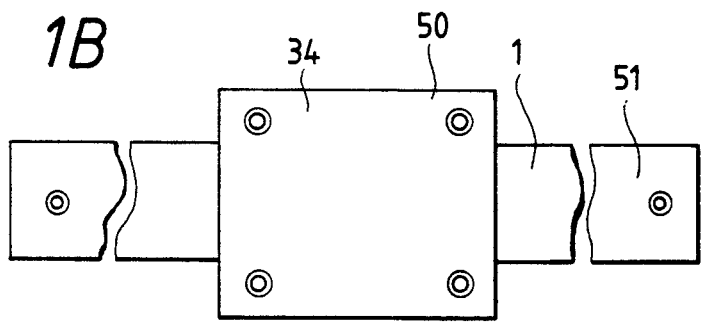
FIG. 1B is a plan view showing the same.

As shown in FIG. 1B, the guide rail 1 is fixedly mounted on a predetermined mounting stand by using mounting bolt holes 51. The machine table, which is to be moved, is mounted on the upper surface of the table fixing board 34 by using the screw holes 50.

The roller type linear movement guiding device thus organized functions as follows:

A load applied to the table fixing board 34 is shared by the two roller type linear movement guiding bearings 3 and 3 through the holding board 5. In this case, even if the table fixing board 34 is inclined because of its mounting error or its eccentric weight, the inclination is automatically eliminated by the automatic aligning function of the steel ball 33 interposed between the holding board 5 and the table fixing board 34, and therefore the holding board 5 is not inclined. That is, even if a load to the table fixing board 34 is eccentric, it is concentrated at the load center of the holding board 5 through the steel ball 33, thus being uniformly distributed to the roller type linear movement guiding bearings 3. That is, the roller type linear movement guiding device of the invention, unlike the conventional one, is free from the difficulty that because of the rolling or pitching of the holding board 5, the roller type linear movement guiding bearings 3 are unevenly loaded as indicated at $W_1$ and $W_2$ in FIGS. 10 and 11, whereby they are twisted.

As the table fixing board 34 moves linearly together with the machine table, the rollers 22 in the roller type linear movement guiding bearings 3 are circulated infinitely while rolling on the track surface 2 of the guide rail 1. The load applied to the table fixing board 34 from above is supported by the guide rail 1 through the roller type linear movement guiding bearings 3.

When the roller type linear movement guiding device is moved, the right and left seal plates 38 and 38 enclosing the roller type linear movement guiding bearings 3 are moved while being kept in slide contact with the inner surfaces of the guide grooves 1A and 1A of the guide rail 1, while the front and rear seal plates 39 and 39 are moved while wiping the track surface 2 of the guide rail 1. The slide resistances of those seal plates act to damp the vibration of the roller type linear movement guiding bearings 3. Therefore, the roller type linear movement guiding bearings 3 are moved smoothly and silently.

Figure 6:
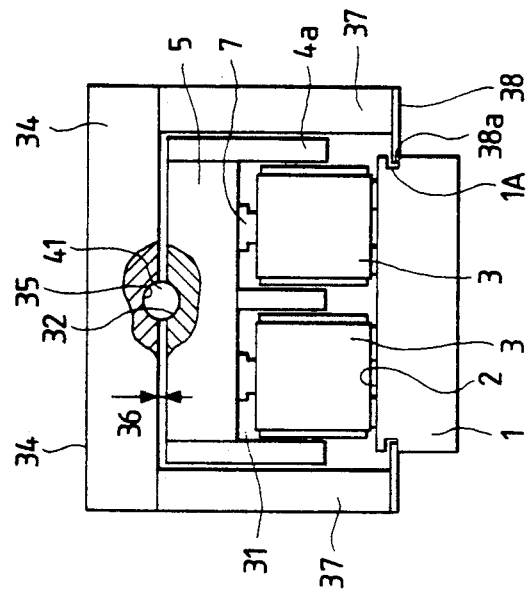
FIGS. 6 and 7 are a front view and a side view, with parts cut away, showing another roller type linear movement guiding device, which constitutes a second embodiment of the invention.
Figure 7:
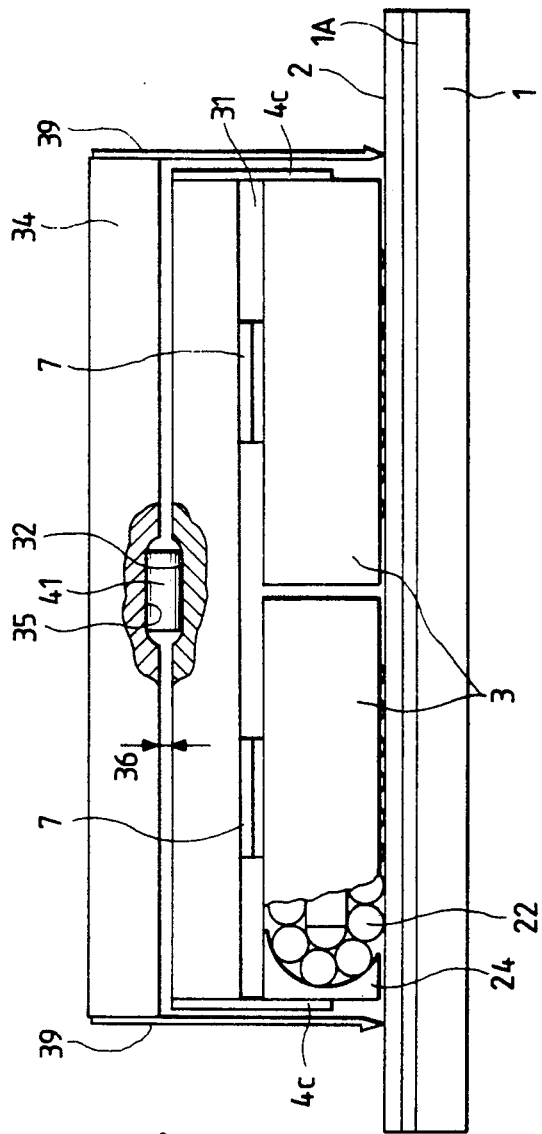

Another roller type linear movement guiding device, a second embodiment of the invention, is as shown in FIGS. 6 and 7. The second embodiment is different from the above-described first embodiment only in that, instead of the steel ball 33, a cylindrical roller 41 is employed, and four roller type linear movement guiding bearings 3 are used. The cylindrical roller 41 is laid in such a manner that it is extended longitudinally of the roller type linear movement guiding device. Recesses 32 and 35 are formed in the upper surface of the holding board 5 and in the lower surface of the table fixing board 34, respectively, in compliance with the configuration of the cylindrical roller 41. The other arrangements, functions and effects of the second embodiment are the same as those of the first embodiment.

Figure 8:
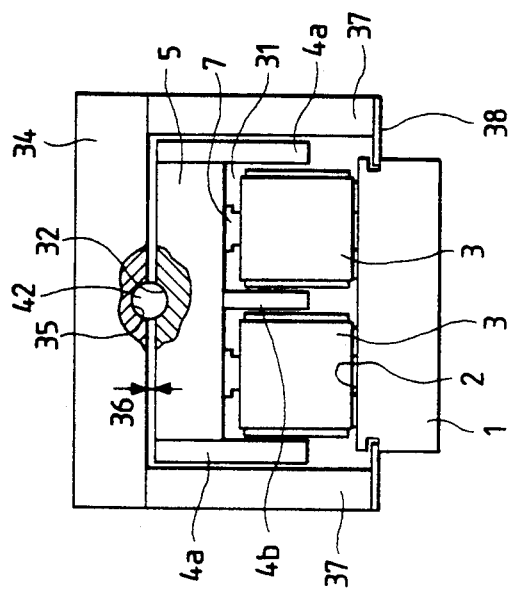
FIGS. 8 and 9 are a front view and a side view, with parts cut away, showing another roller type linear movement guiding device, which constitutes a third embodiment of the invention.
Figure 9:
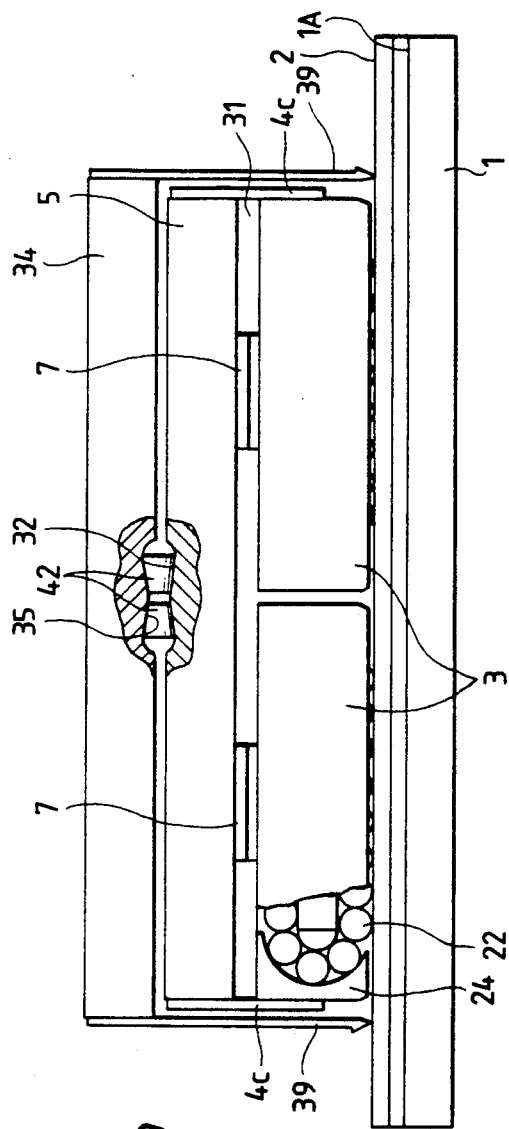

Another roller type linear movement guiding device, a third embodiment of the invention, is as shown in FIGS. 8 and 9. In the third embodiment, two circular-truncated-cone-shaped rollers 42 and 42 serve as the aligning curved surface body. The circular-truncated-cone-shaped rollers 42 and 42 are laid in such a manner that they are extended longitudinally of the roller type linear movement guiding device with their small diameter end faces confronted directly with each other. Recesses 32 and 35 are formed in the upper surface of the holding board 5 and in the lower surface of the table fixing board 34, respectively, in compliance with the configuration of the circular-truncated-cone-shaped rollers 42. The other arrangements, functions and effects of the third embodiment are the same as those of the second embodiment.

The above-described embodiments of the invention employ the roller type linear movement guiding bearings 3 as shown in FIGS. 3 through 5; however, it should be noted that the invention is not limited thereto or thereby. That is, they may be replaced with any other bearing which has a number of rollers which circulate infinitely while rolling on a flat track surface.

In the above-described embodiment, the holding board 5 is supported with the fitting plates 7 on the roller type linear movement guiding rollers 3. However, the technical concept of the invention is applicable to a roller type linear movement guiding device which has no such fitting plates.

Further, in the above-mentioned embodiments, the recess 32 and the recess 35 are provided on the holding board 5 and the table fixing board 34, respectively. However, a recess may be formed in at least one of the oppossed surfaces of the holding board 5 and the table fixing board 34 so as to hold the aligning curved surface body 33, 41 or 42.

As was described above, in the roller type linear movement guiding device in which a plurality of roller type linear movement guiding bearings are held with the holding board, the table fixing board is held poised statically over the fixing board through the aligning curved surface body. Hence, even when the table fixing board is inclined, the holding board is not inclined, being poised statically by the automatic aligning action of the aligning curved surface body. Hence, even when a load applied to the table fixing board is eccentric, the device is free from the difficulty that the roller type linear movement guiding bearings are twisted.

While there has been described in connection with the preferred embodiments of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A linear movement guiding device including:
   a plurality of linear movement guiding bearings including a number of rollers which circulate infinitely while rolling on a flat track surface of a guide rail; and
   a holding board for holding said plurality of linear movement guiding bearings on said flat track surface and for distributing a load to said bearings;
   a table fixing board laid over said holding board; and
   means for poising said table fixing board statically, said statically poising means being inserted in a recess portion which is formed in at least one of the opposed surfaces of said table fixing board and holding board.

2. A linear movement guiding device according to claim 1, in which said statically poising means is a steel ball.

3. A linear movement guiding device according to claim 2, in which a recess portion is formed by a first semi-spherical recess formed on said table fixing board and a second semi-spherical recess formed on said holding board, and said first and second recess are substantially equal to said ball in a radius.

4. A linear movement guiding device according to claim 1, in which said statically poising means is a cylindrical roller.

5. A linear movement guiding device according to claim 1, in which said statically poising means is a pair of circular-truncated-cone-shaped rollers.

6. A linear movement guiding device according to claim 1, wherein said table fixing board has right and left side boards which are extended downwardly, and said right and left side boards are sealingly in slide contact with said guide rail in such a manner that said roller type linear movement guiding bearing are enclosed below said table fixing board.

* * * * *